United States Patent
Yasui et al.

(10) Patent No.: US 8,475,952 B2
(45) Date of Patent: Jul. 2, 2013

(54) BATTERY MODULE AND BATTERY PACK USING THE SAME

(75) Inventors: Shunsuke Yasui, Osaka (JP); Hiroshi Takasaki, Osaka (JP); Takuya Nakashima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/123,780

(22) PCT Filed: Jul. 9, 2010

(86) PCT No.: PCT/JP2010/004486
§ 371 (c)(1),
(2), (4) Date: Apr. 12, 2011

(87) PCT Pub. No.: WO2011/007534
PCT Pub. Date: Jan. 20, 2011

(65) Prior Publication Data
US 2011/0200856 A1     Aug. 18, 2011

(30) Foreign Application Priority Data
Jul. 17, 2009  (JP) .................................. 2009-168517

(51) Int. Cl.
*H01M 10/50*  (2006.01)
(52) U.S. Cl.
USPC ........................................................ 429/120
(58) Field of Classification Search
USPC ................. 429/57–59, 61–62, 71–72, 90, 96, 429/99, 110, 112, 120, 122–125, 129, 142, 429/144, 148–154, 156, 158–164; 29/623.1
See application file for complete search history.

(56) References Cited

U.S. PATENT DOCUMENTS

| | | | |
|---|---|---|---|
| 2007/0178377 A1* | 8/2007 | Kim et al. | .................... 429/152 |
| 2009/0087727 A1 | 4/2009 | Harada et al. | |
| 2010/0047673 A1 | 2/2010 | Hirakawa et al. | |

FOREIGN PATENT DOCUMENTS

| | | |
|---|---|---|
| JP | 03-291867 | 12/1991 |
| JP | 09-259940 | 10/1997 |
| JP | 10-040881 | 2/1998 |
| JP | 2000-208118 | 7/2000 |
| JP | 2000-223166 | 8/2000 |
| JP | 2002-134078 | 5/2002 |
| JP | 2004-171856 | 6/2004 |
| JP | 2007-027011 | 2/2007 |
| JP | 2008-117756 | 5/2008 |
| JP | 2009-054297 | 3/2009 |

OTHER PUBLICATIONS

Machine Translation and Abstract in English of JP 2009-054297.*
Machine Translation and Abstract in English of JP 2008-117756.*

* cited by examiner

*Primary Examiner* — Barbara Gilliam
*Assistant Examiner* — Claire L. Roe
(74) *Attorney, Agent, or Firm* — McDermott Will & Emery LLP (57) ABSTRACT

The battery module includes: a plurality of batteries; a housing 50 in which the plurality of batteries are aligned and stored; and a cooling pipe 70 provided along the plurality of batteries in the housing 50, the cooling pipe 70 being filled with a cooling medium, wherein the cooling pipe 70 is made of a material which melts when the temperature of the battery reaches or exceeds a predetermined temperature.

16 Claims, 9 Drawing Sheets

BATTERY MODULE AND BATTERY PACK USING THE SAME

RELATED APPLICATIONS

This application is the U.S. National Phase under 35 U.S.C. §371 of International Application No. PCT/JP2010/004486, filed on Jul. 9, 2010, which in turn claims the benefit of Japanese Application No. 2009-168517, filed on Jul. 17, 2009, the disclosures of which Applications are incorporated by reference herein.

TECHNICAL FIELD

The present invention relates to battery modules including a plurality of batteries aligned and accommodated in housings, and to battery packs using the same.

BACKGROUND ART

In recent years, in view of savings in resources and conservation of energy, there have been increasing demands for nickel-hydrogen secondary batteries, nickel-cadmium secondary batteries, lithium ion secondary batteries, etc. which can be used repeatedly. Among them, lithium ion secondary batteries are characterized by lightness in weight, high electromotive force, and high energy density. Thus, there are growing demands for the lithium ion secondary batteries as power sources for driving various kinds of mobile electronic devices and portable communication devices such as mobile phones, digital cameras, video cameras, and laptop personal computers.

On the other hand, to reduce used amount of fossil fuel, and to reduce the amount of emission of $CO_2$, expectations for battery packs are growing to serve as power sources for driving motors such as vehicles. Such a battery pack includes a plurality of battery modules each including one or more batteries in order to obtain a preferable voltage and capacity.

In the development of the above battery modules, downsizing the battery modules is a major challenge because the battery modules for storing predetermined electric power are accommodated in limited space, for example, in a vehicle.

For this purpose, a configuration is disclosed in which a battery assembly (a battery module) includes a plurality of batteries, and the connection between the batteries and an interconnect for detecting a voltage, temperature, or the like are implemented by patterned interconnects formed on a printed circuit board (for example, see Patent Document 1). Likewise, a power supply device (a battery pack) is disclosed in which a plurality of power modules are accommodated in a holder case, and is connected to each other by an end plate (for example, see Patent Document 2). The end plate is provided with a sensor lead and a power-supply lead for connecting the battery modules to each other, so that it is possible to reduce connection failures, and downsizing can be possible.

Moreover, as the capacity of a battery to be accommodated in a battery module increases, heat may be generated in the battery itself, and the battery may have a high temperature depending on how it is utilized. Thus, in addition to the safety of the battery itself, the safety of the battery module, which is a collection of batteries, becomes more important. That is, the internal pressure of the battery may be increased by gas generated due to overcharge, overdischarge, or an internal or external short-circuit, and thus the outer case of the battery may rupture. For this reason, generally, a battery is provided with a vent mechanism or a safety valve to release gas so that the gas in the battery is released. Here, when the released gas is, for example, ignited, smoking may occur, or in rare cases, combustion may occur, which poses a problem with reliability and safety.

For this reason, a power supply device (battery module) is disclosed in which a plurality of batteries are accommodated in a battery chamber within a case, and a partitioning wall has openings facing safety valves of the batteries, so that gas emitted from a battery in a fault state is released from an outlet via an exhaust chamber (for example, see Patent Document 3).

CITATION LIST

Patent Document

Patent Document 1: Japanese Patent Publication 2000-208118
Patent Document 2: Japanese Patent Publication 2000-223166
Patent Document 3: Japanese Patent Publication 2007-27011

SUMMARY OF THE INVENTION

Technical Problem

However, in the battery modules described in Patent Document 1 and Patent Document 2, when excessive heat is generated in one battery to allow the operation of the safety valve, it is not possible to control the amount of the heat generated in the battery, or the influence of ignition of emitted gas over neighboring batteries, which causes the problem of consecutively deteriorating the batteries. In particular, in a battery module including a plurality of batteries, how expansion of the influence of a battery having a problem over neighboring batteries is controlled to a minimum is a problem to be solved.

Moreover, in the battery module described in Patent Document 3, the partitioning wall of the case has the openings facing the safety valves of the batteries so that the emitted gas does not fill the battery chamber, but is released to the outside. Patent Document 3 discloses a circuit board built in a resin, but fails to teach or suggest, for example, a method for connecting the circuit board to the batteries. Therefore, when a surface on a safety valve side of each battery is connected to a connector, it is not clear how air-tightness with respect to the partitioning wall is maintained. Further, it is difficult to position the safety valve of each battery to the opening portion of the partitioning wall, and thus positioning using recessed portions leaves space between the batteries, so that downsizing is not possible. Furthermore, the batteries and the circuit board are fixed and built in a resin, which poses a problem with downsizing the battery module.

In addition, when such a battery module including a large number of batteries is operated (charged/discharged) at a high electric power as a power supply, the amount of heat generated along with the charge/discharge is also large. Thus, the batteries have to be cooled so that the battery module is safely operated.

The present invention was devised to solve the above problems. It is an object of the present invention to provide a battery module whose size and thickness are reduced, wherein the influence of excessive heat generation in a battery having a problem over neighboring batteries can be limited to a minimum, and the battery module has a configuration capable of cooling a plurality of batteries.

Solution to the Problem

In order to achieve the above object, a battery module of the present invention includes a plurality of batteries, a housing in which the plurality of batteries are aligned and stored, and a cooling pipe provided along the plurality of batteries in the housing, the cooling pipe being filled with a cooling medium, wherein the cooling pipe is made of a material which melts when the temperature of the battery reaches or exceeds a predetermined temperature.

With this configuration, the cooling pipe provided along the plurality of batteries increases the area of contact with the batteries, thereby increasing the cooling effect. Moreover, when a problem occurs and heat is generated in a battery, the cooling pipe melts, allowing the cooling medium to flow out thereof, which can rapidly cool the batteries due to the latent heat effect. As a result, the temperature rise due to charge/discharge can be reduced during normal operation, and a battery can be rapidly cooled in case the battery has an abnormally high temperature such as in case of combustion in the battery, thereby reducing the influence of the heat over the other batteries.

Here, it is preferable that each of the batteries have an opening portion at an electrode portion of the battery to release gas generated in the battery outside the battery, the housing be partitioned by a flat plate disposed in contact with battery cases around the electrode portions of the batteries into a storage portion in which the plurality of batteries are stored, and an exhaust chamber via which the gas released from the opening portion of the electrode portion is exhausted outside the housing, and the opening portions of the electrode portions be in communication with the exhaust chamber via through holes formed in the flat plate. With this configuration, space into which gas emitted as a result of opening a vent mechanism of the battery is released can be limited to be within the through hole. Thus, the gas released from the opening portion of the electrode portion is released into the exhaust chamber via the through hole, and is further released outside the housing. Therefore, the gas can be prevented from entering neighboring batteries. As a result, it is possible to obtain a thin and small battery module which has substantially the same height as that of the batteries, and which is highly safe and has high reliability.

Moreover, a battery pack of the present invention includes multiple ones of the above battery module which are connected in series and/or parallel. With this configuration, a battery pack having a given voltage and capacity can be obtained according to the application.

Advantages of the Invention

According to the present invention, it is possible to obtain a battery module whose size and thickness are reduced, wherein the influence of excessive heat generation in a battery having a problem over neighboring batteries can be limited to a minimum, and temperatures of the batteries in the battery module can also be controlled.

DESCRIPTION OF EMBODIMENTS

The battery module of the present invention includes a plurality of batteries, a housing in which the plurality of batteries are aligned and stored, and a cooling pipe provided along the plurality of batteries in the housing, the cooling pipe being filled with a cooling medium, wherein the cooling pipe is made of a material which melts when the temperature of the battery reaches or exceeds a predetermined temperature.

With this configuration, the cooling pipe provided along the plurality of batteries increases the area of contact with the batteries, thereby increasing the cooling effect. Moreover, when a problem occurs and heat is generated in a battery, the cooling pipe melts, allowing the cooling medium to flow out thereof, which can rapidly cool the batteries due to the latent heat effect. As a result, the temperature rise due to charge/discharge can be reduced during normal operation, and a battery can be rapidly cooled in case the battery has an abnormally high temperature such as in case of combustion in the battery, thereby reducing the influence of the heat over the other batteries.

Here, it is preferable that each of the batteries have an opening portion at an electrode portion of the battery to release gas generated in the battery outside the battery, the housing be partitioned by a flat plate disposed in contact with battery cases around the electrode portions of the batteries into a storage portion in which the plurality of batteries are stored, and an exhaust chamber via which the gas released from the opening portion of the electrode portion is exhausted outside the housing, and the opening portions of the electrode portions be in communication with the exhaust chamber via through holes formed in the flat plate. With this configuration, space into which gas emitted as a result of opening a vent mechanism of the battery is released can be limited to be within the through hole. Thus, the gas released from the opening portion of the electrode portion is released into the exhaust chamber via the through hole, and is further released outside the housing. Therefore, the gas can be prevented from entering neighboring batteries. As a result, it is possible to obtain a thin and small battery module which has substantially the same height as that of the batteries, and which is highly safe and has high reliability.

Moreover, it is preferable that the cooling pipe be made of a resin compact having a hollow portion, and the plurality of batteries be closely in contact with and fixed to an inner wall of the hollow portion. With this configuration, the cooling effect by the cooling pipe can further be increased, and the plurality of batteries stored in the storage portion can easily be fixed by the cooling pipe.

Moreover, the cooling pipe preferably has a layered structure including a metal film and resin layers provided on both surfaces of the metal film. With this configuration, it is possible to obtain a battery module in which the cooling medium flowing through the cooling pipe is kept stable, and which is highly safe for a long period of time.

Moreover, the cooling pipe is preferably in the shape of a sheet. With this configuration, the cooling pipe can have a large area of contact with the batteries included in the battery module, so that it is possible to efficiently cool the batteries.

Here, it is preferable that the flat plate be made of a circuit board, and the electrode portions of the batteries be connected to a connector formed on the circuit board. With this configuration, space required for routing a power supply interconnect, a control interconnect, etc. can significantly be reduced by the circuit board.

Moreover, the electrode portions of the batteries are preferably inserted in the through holes of the flat plate. With this configuration, gas released from the opening portion of the electrode portion can efficiently be released outside the housing via the through hole.

Moreover, the storage portion is sealed by the flat plate. With this configuration, it can be ensured that gas released from the opening portion of the electrode portion is released outside the housing via the through hole and the exhaust chamber without influencing the other batteries. Note that "sealed" does not necessarily mean a completely sealed state, but includes such a sealed state that gas in an amount having no influence returns from the exhaust chamber to the storage portion.

A battery pack of the present invention includes multiple ones of the above battery module which are connected in series and/or parallel. With this configuration, it is possible to obtain a battery pack having a given voltage and capacity depending on the application.

Embodiments of the present invention will be described below with reference to the drawings, where the use of the same reference symbols in different drawings indicates similar or identical items. The present invention is not limited to the below described contents as long as it is based on the basic features described in this specification. As a battery, a nonaqueous electrolyte secondary battery, e.g., a lithium ion secondary battery, in a cylindrical shape (hereinafter referred to as a "battery") will be described below by way of example, but of course, the invention is not limited to these embodiments.

Figure 1:
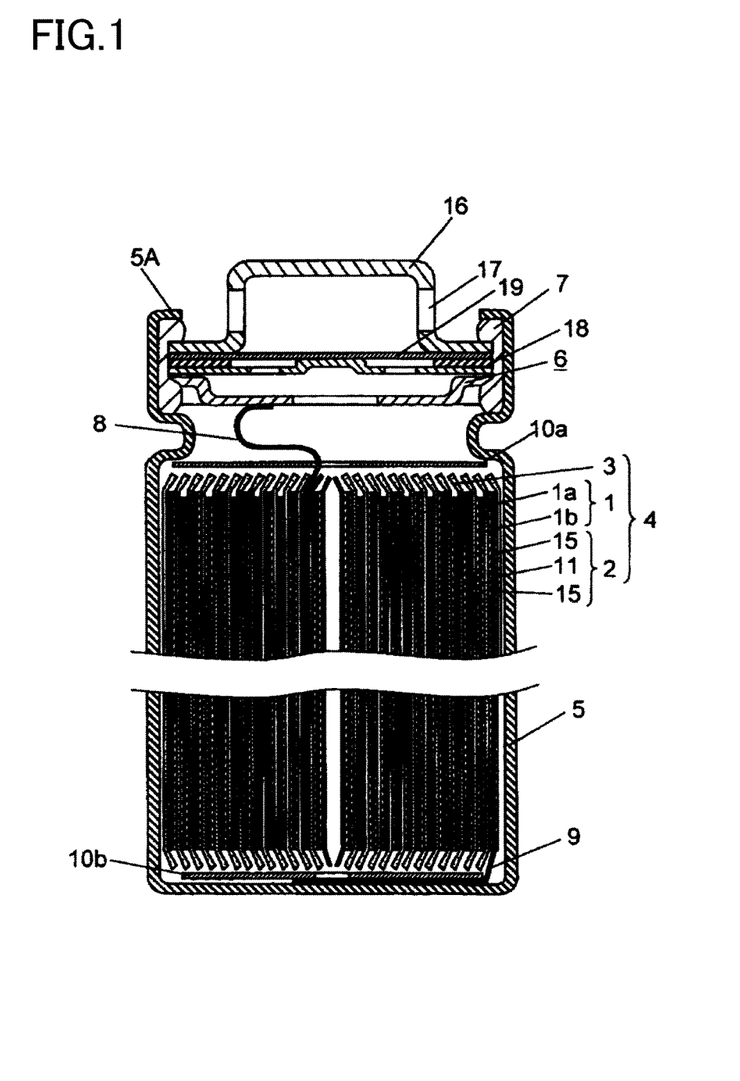
FIG. 1 is a cross-sectional view illustrating a battery included in a battery module of an embodiment of the present invention.

FIG. 1 is a cross-sectional view illustrating a battery included in a battery module of an embodiment of the present invention. Note that although a battery module including a plurality of batteries connected in parallel will be described below by way of example, a battery module including batteries connected in series may be possible.

As illustrated in FIG. 1, the battery in a cylindrical shape includes an electrode group 4 in which a positive electrode 1 and a negative electrode 2 are wound with a separator 3 interposed therebetween. The positive electrode 1 includes a positive electrode lead 8 made of, for example, aluminum. The negative electrode 2 faces the positive electrode 1. One end of the negative electrode 2 is provided with a negative electrode lead 9 made of, for example, copper. Insulating plates 10a, 10b are installed above and below the electrode group 4, and the electrode group 4 with the insulating plates 10a, 10b is inserted in a battery case 5. The other end of the positive electrode lead 8 is welded to a sealing plate 6. The other end of the negative electrode lead 9 is welded to a bottom of the battery case 5. A nonaqueous electrolyte (not shown) capable of conducting lithium ions is injected in the battery case 5. An opening end of the battery case 5 is crimped to a positive electrode cap 16 included in one electrode portion, a current cutoff member 18 such as a PTC element, and the sealing plate 6 via a gasket 7. The positive electrode 1 includes a positive electrode current collector 1a and a positive electrode layer 1b containing a positive electrode active material.

Here, the positive electrode cap 16 protrudes from an upper surface 5A of the opening end of the battery case 5. A side surface of the positive electrode cap 16 is provided with an opening portion 17 to release gas resulting from opening of a vent mechanism 19 such as a safety valve due to a problem in the electrode group 4. Note that the height of a portion of the positive electrode cap 16 which protrudes from the upper surface 5A is almost the same as the thickness of, for example, a circuit board, which will be described below. Although an example in which the positive electrode cap 16 is provided to protrude from the upper surface 5A of the battery case 5 will be described below, a battery having a positive electrode cap provided to be flush with an upper surface 5A of a battery case 5 may be possible.

Here, the positive electrode layer 1b contains, as the positive electrode active material, for example, a lithium-containing compound oxide such as $LiCoO_2$, $LiNiO_2$, $Li_2MnO_4$, a mixture of these materials, or a complex compound of these materials. The positive electrode layer 1b further contains a conductive agent and a binder. Examples of the conductive agent include graphites such as natural graphite and artificial graphite, and carbon blacks such as acetylene black, ketjen black, channel black, furnace black, lamp black, and thermal black. Examples of the binder include PVDF, polytetrafluoroethylene, polyethylene, polypropylene, an aramid resin, polyamide, polyimide, etc.

Moreover, as the positive electrode current collector 1a used for the positive electrode 1, aluminum (Al), carbon (C), or a conductive resin can be used.

As the nonaqueous electrolyte, an electrolyte solution obtained by dissolving a solute in an organic solvent, or a so-called polymer electrolyte layer including the electrolyte solution solidified by macromolecules can be used. As the solute of the nonaqueous electrolyte, $LiPF_6$, $LiBF_4$, $LiClO_4$, $LiAlCl_4$, $LiSbF_6$, $LiSCN$, $LiCF_3SO_3$, $LiN(CF_3CO_2)$, $LiN(CF_3SO_2)_2$, or the like can be used. Furthermore, as the organic solvent, for example, ethylene carbonate (EC), propylene carbonate, butylene carbonate, vinylene carbonate, dimethyl carbonate (DMC), diethyl carbonate, ethyl methyl carbonate (EMC), or the like can be used.

Moreover, a negative electrode current collector 11 of the negative electrode 2 can be metal foil made of stainless steel, nickel, copper, titanium, or the like, or thin film made of carbon or a conductive resin.

Furthermore, as negative electrode layers 15 of the negative electrode 2, a negative electrode active material, e.g., silicon (Si), tin (Sn), or a carbon material such as graphite, which is capable of reversibly inserting and extracting lithium ions, and has a theoretical capacity density of 833 mAh/cm$^3$ or higher can be used.

A battery module of the embodiment of the present invention will be described in detail below with reference to FIGS. 2A-2C, 3, 4A, 4B, and 5.

Figure 2:
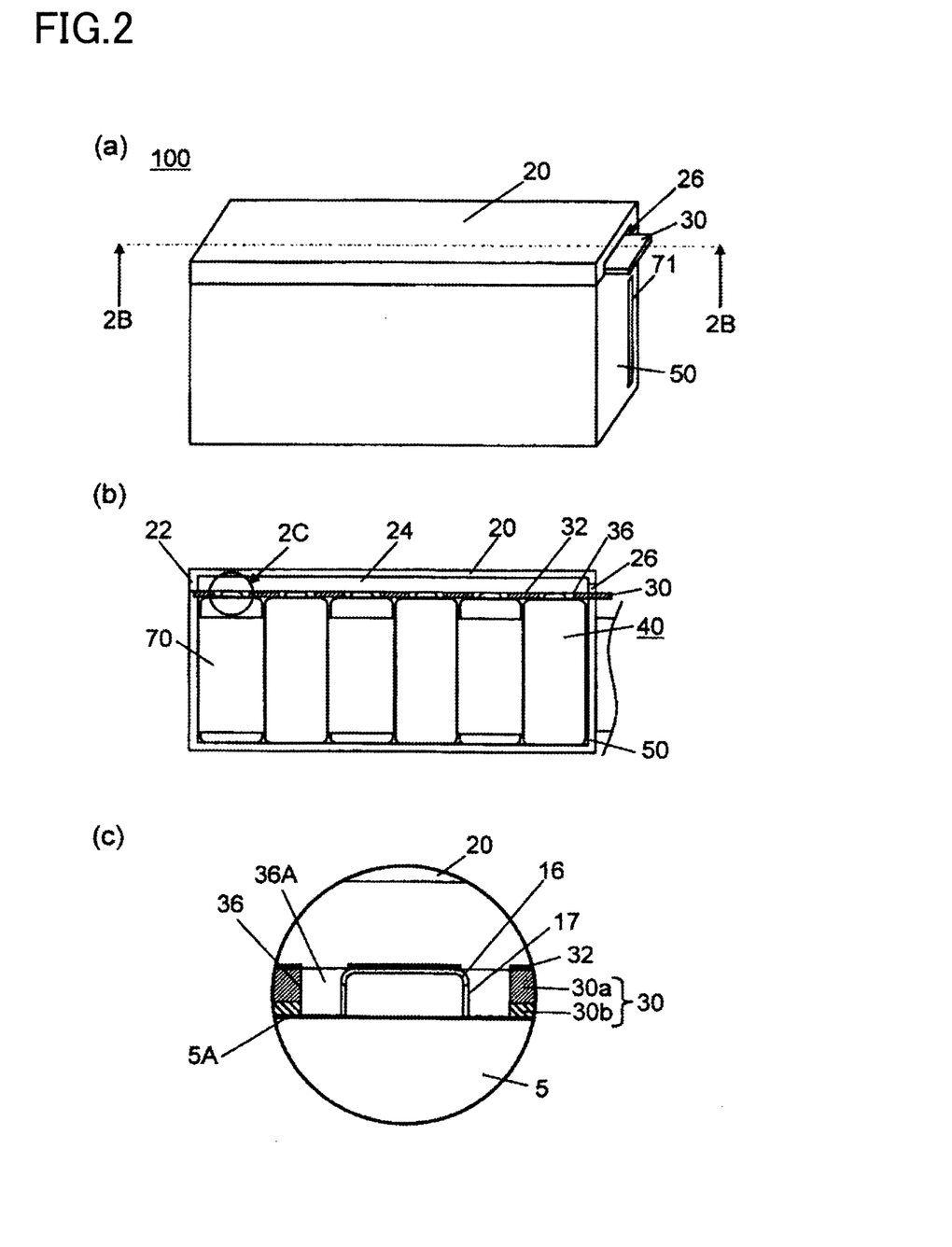
FIG. 2A is a perspective view illustrating the exterior of the battery module of the embodiment of the present invention.
FIG. 2B is a cross-sectional view along the line 2B-2B of FIG. 2A.
FIG. 2C is an enlarged cross-sectional view of the part 2C of FIG. 2B.
Figure 3:
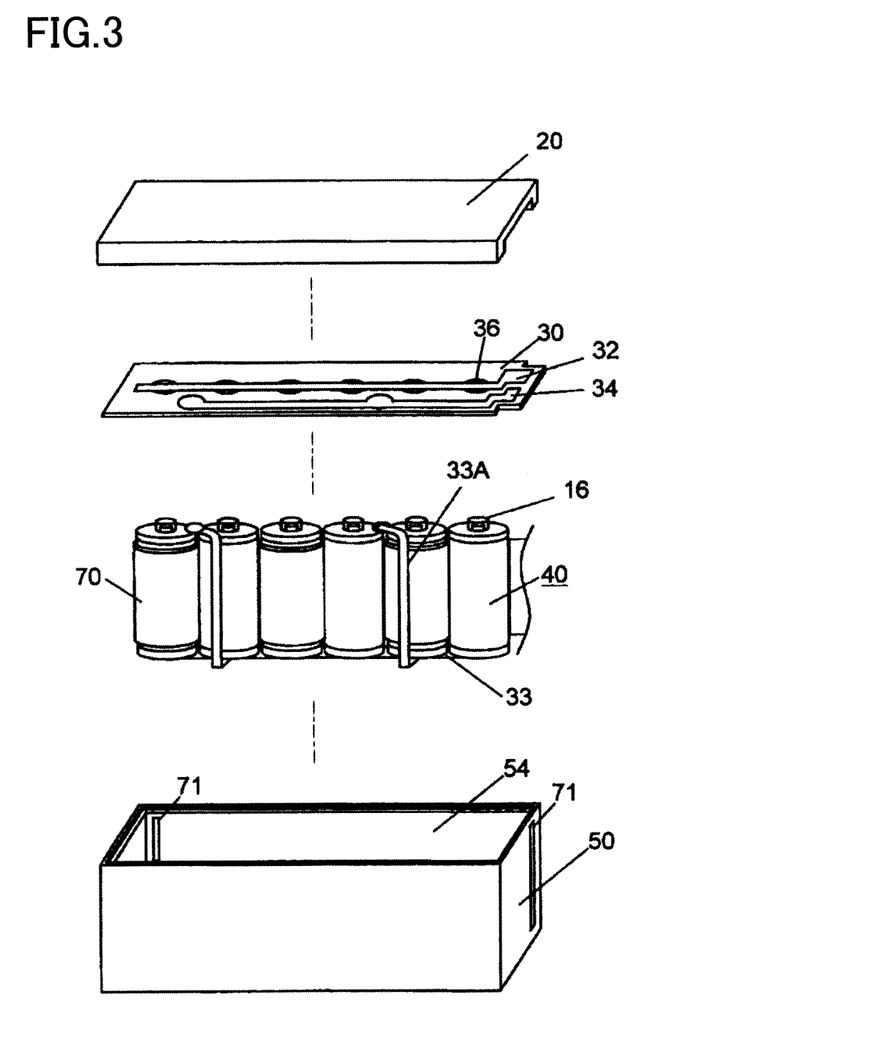
FIG. 3 is an exploded perspective view illustrating the battery module of the embodiment of the present invention.

FIG. 2A is a perspective view illustrating the exterior of the battery module of the embodiment of the present invention. FIG. 2B is a cross-sectional view along the line 2B-2B of FIG. 2A. FIG. 2C is an enlarged cross-sectional view of the part 2C of FIG. 2B. FIG. 3 is an exploded perspective view illustrating the battery module of the embodiment of the present invention.

As illustrated in FIGS. 2A and 3, a battery module 100 includes a housing 50 made of an insulating resin material such as a polycarbonate resin, and a lid body 20 fitting into the housing 50.

As illustrated in FIGS. 2B and 3, a battery unit 40 is stored in the housing 50. The battery unit 40 is formed in such a manner that a plurality of batteries whose positive electrode caps 16 are aligned in the same direction are electrically connected in parallel by connectors 32, 34 of a circuit board 30. Moreover, a connection plate 33 by which bottoms each serving as one of electrode portions (negative electrode) of the battery are connected in parallel is connected to the connector 34 of the circuit board 30 by extension portions 33A each extending from a part of the connection plate 33.

Moreover, as illustrated in FIG. 2C, the positive electrode caps 16 protruding from the battery cases 5 are inserted inside through holes 36 in the circuit board 30, where the through holes 36 are provided for the batteries, respectively. The positive electrode caps 16 are connected to the connector 32 of the circuit board 30. Here, the circuit board 30 is in contact with and closely attached to the battery cases 5, and each through hole 36 has a gap 36A so that the opening portion 17 provided in the side surface of the positive electrode cap 16 is not covered. The gap 36A serves as space into which gas emitted from the opening portion 17 of the positive electrode cap 16 on the occurrence of a problem in the battery is released.

Then, as illustrated in FIGS. 2B and 3, the emitted gas passes through the gap 36A between the connector 32 of the circuit board 30 and the positive electrode cap in the through hole 36, and through space in an exhaust chamber 24 of the housing 50, and then is released from an opening 26 in communication with the outside.

Moreover, as illustrated in FIG. 2B, a cooling pipe 70 is provided along the batteries included in the battery module 100. As illustrated in FIGS. 2A and 3, the housing 50 includes cooling pipe insertion openings 71. Note that in FIGS. 2A and 3, the cooling pipe 70 provided in a zigzag arrangement between the batteries is illustrated by way of example, but the present invention is not limited to this example. For example, along a direction in which the batteries of the battery unit 40 are aligned, the cooling pipe 70 may be arranged in contact with one or both sides of the batteries.

Components included in the battery module 100 will be described below with reference to the drawings.

First, as illustrated in FIG. 3, the housing 50 includes an opening end on a side on which the lid body 20 is fitted into the housing 50, and a storage portion 54 into which the plurality of batteries are installed from the opening end side. Here, when batteries each have, for example, an outer diameter of 18 mm, and a height of 65 mm, the height of the storage portion 54 is approximately a value obtained by adding the thickness of the connection plate 33 to 65 mm.

Moreover, as illustrated in FIGS. 2B and 3, the lid body 20 includes the exhaust chamber 24 formed by external walls 22, and the opening 26 provided in a part of the external walls 22.

Moreover, as illustrated in FIG. 2C, the circuit board 30 has a layered structure including at least two layers, a heat-resistant member 30a made of, for example, a glass and epoxy substrate or polyimide, and an elastic member 30b having, for example, rubber elasticity. Since the elastic member 30b elastically deforms and comes closely in contact with the upper surfaces 5A of the battery cases 5, a high degree of air-tightness can be ensured. Note that as long as a high degree of air-tightness can be ensured, it is not particularly necessary for the circuit board 30 to have the layered structure. Further, the circuit board 30 includes the connector 32 which is to be connected to the positive electrode caps 16 of the batteries inserted in the through holes 36, and the connector 34 which is to be connected to the extension portions 33A of the connection plate 33 connecting the other electrodes (e.g., negative electrodes) of the batteries in parallel. The connector 32 is provided such that the connector 32 does not completely cover the through holes 36. Note that the connector 32 and the connection plate 33 are made of, for example, a nickel plate, a Cu plate, an Al plate, or a lead wire, and the connection plate 33 is connected to the connector 34 made of copper foil, or the like by, for example, soldering. Moreover, connection of the positive electrode caps 16 to the connector 32, and connection of the negative electrodes to the connection plate 33 are achieved by, for example, electric welding or spot welding.

In this way, the plurality of batteries included in the battery module can be connected by the circuit board, so that it is possible to significantly reduce space required for routing a power supply interconnect or a control interconnect. Moreover, the opening portions of the positive electrode caps of the batteries are placed in the through holes of the circuit board. As a result, gas emitted from a battery on the occurrence of a problem cannot enter neighboring batteries, and thus even if the gas is ignited for combustion, flames can be prevented from entering the neighboring battery cases, and blocking the effect of the flames can be ensured.

The cooling pipe 70 is made of a deformable material. Thus, it is possible to increase the area of contact with the batteries. The cooling pipe 70 is filled with a cooling medium such as water. The cooling medium may circulate in the cooling pipe 70 in order to further increase the cooling effect.

The operation and advantages of the battery module 100 of the present embodiment in case of, for example, excessive heat generation in one of the batteries connected in parallel in the battery module 100 will be described below with reference to FIGS. 4A and 4B.

Figure 4:
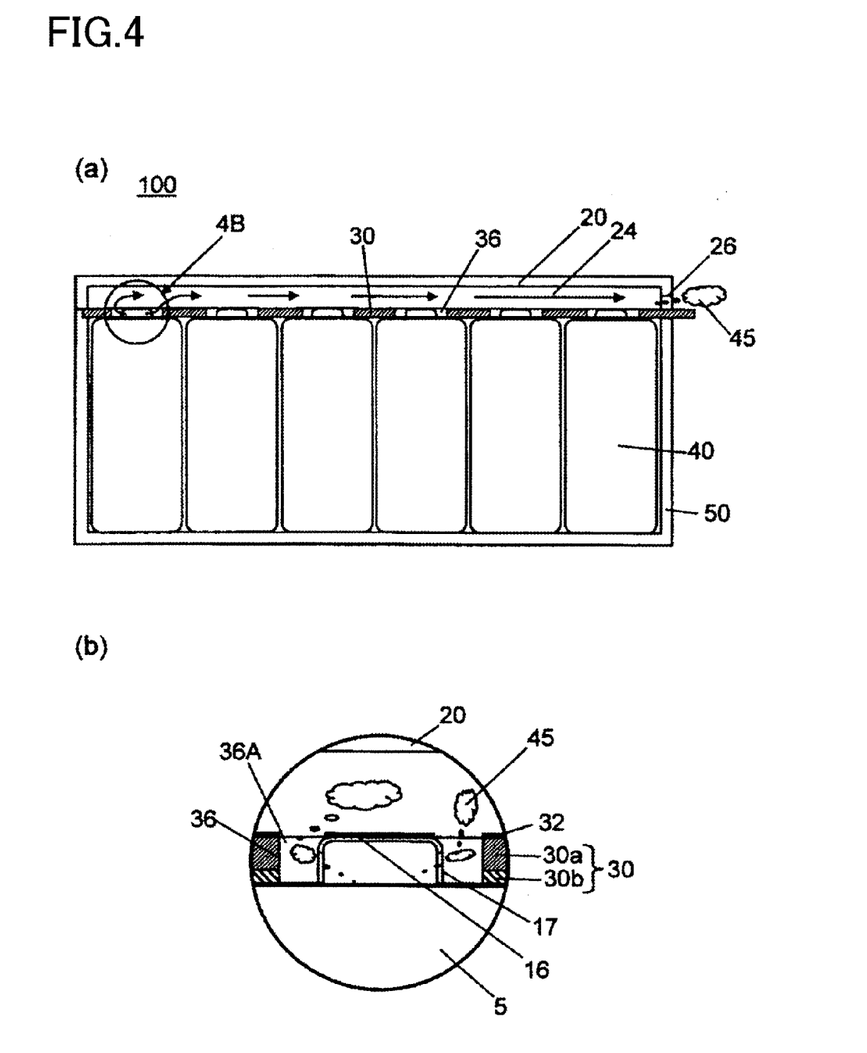
FIG. 4A is a cross-sectional view illustrating exhaustion of gas emitted in case of, for example, excessive heat generation in one of the batteries in the battery module of the embodiment of the present invention.
FIG. 4B is an enlarged cross-sectional view of the part 4B of FIG. 4A.

FIG. 4A is a cross-sectional view illustrating exhaustion of gas emitted in case of, for example, excessive heat generation in one of the batteries in the battery module 100 of the present embodiment. FIG. 4B is an enlarged cross-sectional view of the part 4B of FIG. 4A.

First, as illustrated in FIG. 4B, excessive heat is generated in one of the batteries, which increases the gas pressure of gas generated in the battery, thereby operating a vent mechanism (e.g., a safety valve), so that gas 45 is emitted from the battery. Then, the emitted gas 45 is emitted through the opening portion 17 of the positive electrode cap 16 into the gap 36A of the through hole 36 inside which the positive electrode cap 16 is inserted.

Next, as illustrated in FIG. 4A, the gas 45 does not fill the gap 36A, but is exhausted into the exhaust chamber 24 of the lid body 20 via the through hole 36 which is not covered by the connector 32 of the circuit board 30. Then, the gas 45 is eventually released outside the battery module 100 through the opening 26 provided in the lid body 20.

Here, when the gas 45 is rapidly emitted from the battery having a problem, a risk that combustion of the gas is produced by, for example, ignition generally increases.

However, in the battery module 100 having the above configuration of the present invention, the amount of oxygen in the gap 36A in the through hole 36 is limited, and no oxygen is further supplied from the outside. Thus, the possibility of ignition of the gas is very low. As a result, the gas 45 is exhausted in a gaseous state via the through hole 36 of the circuit board 30. Therefore, explosive expansion due to the ignition of the gas is not caused. Thus, there is no rupture of the battery module.

According to the present embodiment, the plurality of batteries included in the battery module are stored in the storage portion of the housing, under a sealed state by at least the circuit board and the housing, and gas emitted from a battery having a problem can be released, in a gaseous state, outside the battery module through the gap of the through hole of the circuit board. As a result, it is possible to obtain a highly safe battery module in which the gas is not ignited for combustion or to generate smoke.

Moreover, the plurality of batteries included in the battery module can be stored in the storage portion of the housing, under the sealed state by at least the circuit board and the housing, so that it is not necessary to individually store the batteries. As a result, the battery module can easily be downsized. Furthermore, space required for routing the power supply interconnect or the control interconnect can significantly be reduced by the circuit board. As a result, it is possible to obtain a battery module which is smaller in size, and has high safety and high reliability.

In the present embodiment, the housing 50 is partitioned by the circuit board 30 into the storage portion 54 in which the plurality of batteries are stored, and the exhaust chamber 24 via which gas released from the opening portion 17 of the electrode portion 16 is exhausted outside the housing 50, but the present invention is not limited to this embodiment. A flat plate which is not provided with the connector 33 may be used to partition the housing 50 into the storage portion 54 and the exhaust chamber 24.

In the present embodiment, the lid body 20 made of an insulating material such as a polycarbonate resin has been described, but the invention is not limited to this embodiment. For example, a metal material such as aluminum, or the metal material covered with an insulating resin may be used. With this configuration, the mechanical strength can be improved to obtain a lid body having a reduced thickness, thereby further downsizing the battery module. Moreover, high thermal-conductivity of the metal material enhances the capability of cooling emitted gas, so that it is also possible to obtain a highly reliable battery module which is less likely to be ignited. Moreover, forming a hole by melting the lid body by the emitted high-temperature gas is prevented to prevent, for example, ignition by supply of oxygen through the hole, which makes it possible to ensure exhaustion of the gas via the exhaust chamber.

Moreover, the cooling pipe 70 preferably has a layered structure including a metal film and resin layers provided on both surfaces of the metal film. With this configuration, it is possible to obtain a battery module in which the cooling medium flowing through the cooling pipe 70 is kept stable, and which is highly safe for a long period of time.

Moreover, the cooling pipe is preferably in the shape of a sheet. With this configuration, the cooling pipe 70 can have a large area of contact with the batteries included in the battery module 100, so that it is possible to efficiently cool the batteries.

Further, the material forming the cooling pipe 70 is preferably melted by heat at the time of excessive heat generation in a battery. With this configuration when a problem occurs and heat (300° C. or higher) is generated in a battery, the cooling pipe 70 is melted, and the cooling medium in the cooling pipe 70 flows out. The cooling medium flowing out of the cooling pipe 70 can rapidly cool the batteries due to the latent heat effect. As a result, the temperature rise due to charge/discharge can be reduced during normal operation, and a battery can be rapidly cooled in case the battery has an abnormally high temperature such as in case of combustion in the battery, thereby reducing the influence of the heat over the other batteries.

Examples of such a material includes a sheet formed into a bag-like shape, the sheet being obtained by laminating, for example, denatured polyethylene (melting point: 60-120° C.) on both surfaces of aluminum foil. The aluminum foil preferably has a thickness within the range of 90-120 μm so that the foil is ruptured by melting in a fault state.

Figure 5:
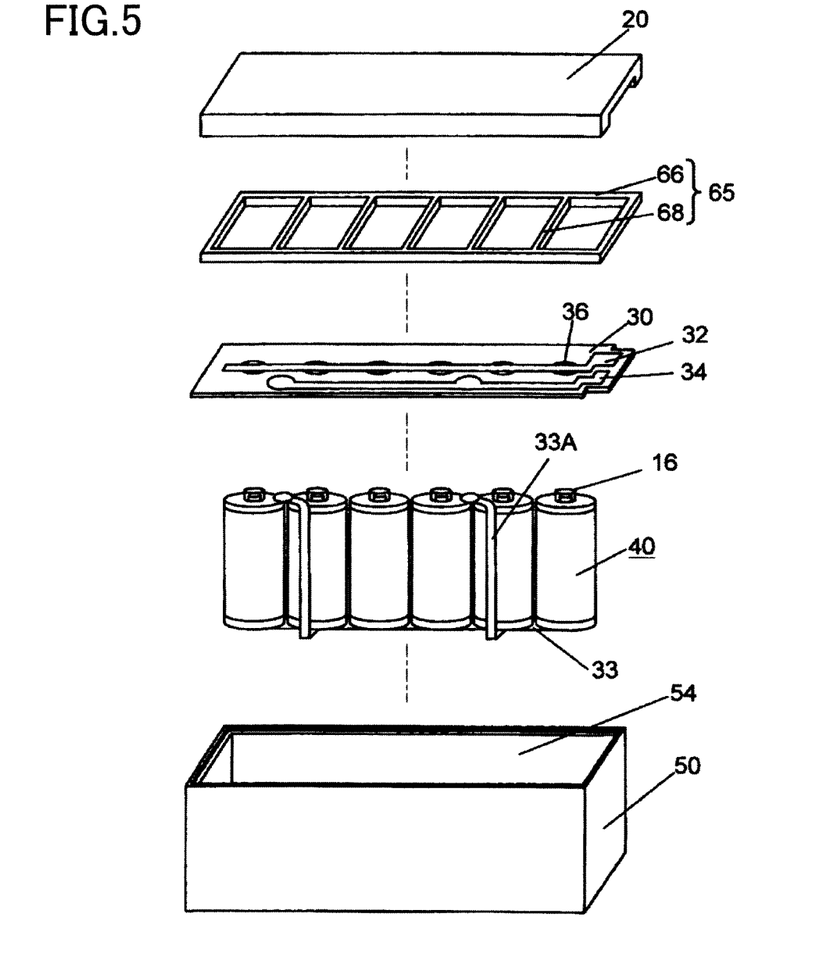
FIG. 5 is an exploded perspective view illustrating another embodiment of the battery module of the present invention.

In the present embodiment, a structure in which the lid body 20 is fitted into the housing 50 to support the circuit board 30 by the external walls 22 of the lid body 20, the housing 50, and the upper surfaces 5A of the battery cases 5 has been described, but the present invention is not limited to this embodiment. For example, as illustrated in FIG. 5 which is an exploded perspective view illustrating a battery module, a supporting member 65 configured to support the circuit board 30 may be interposed between the lid body 20 and the circuit board 30. Note that the cooling pipe 70 is not illustrated in FIG. 5.

In this case, the supporting member 65 includes an external frame 66 for supporting at least an external circumferential portion of the circuit board 30, and supporting portions 68. The supporting portions 68 are provided in positions facing the housing 50, and facing positions at which the upper surfaces 5A of the battery cases 5 are in contact with each other. Here, when the space of the exhaust chamber of the lid body 20 is reduced due to the supporting portions 68 of the supporting member 65, a recessed portion, a hole, or the like which is in communication with the opening of the lid body 20 may be provided in part of the supporting portion 68. In this way, it is possible to ensure fixing of the circuit board 30 by the housing 50, the upper surfaces 5A of the battery cases 5, and the supporting portions 68 of the supporting member 65. As a result, deformation of the circuit board due to pressure caused by emitted gas is reduced, and heat or gas entering battery main bodies of neighboring batteries is more efficiently reduced, so that it is possible to obtain a battery module having further improved reliability and safety.

Figure 6:
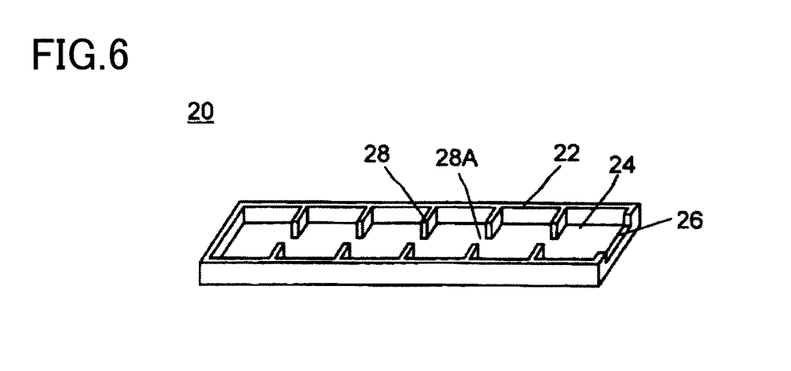
FIG. 6 is a perspective view illustrating another embodiment of the housing of the present invention.

Alternatively, in the exhaust chamber 24 of the lid body 20, rib portions 28 each having an opening hole 28A may be provided in positions facing the housing 50 and the upper surfaces 5A of the battery cases 5 as illustrated in FIG. 6, instead of providing the supporting member 65. Note that the cooling pipe 70 is not illustrated in FIG. 6. In this way, the circuit board 30 can be fixed by the housing, the upper surfaces 5A of the battery cases 5, and the rib portions 28 of the lid body 20, and the size or the thickness of the battery module can further be reduced.

In the present embodiment, the circuit board provided with the power supply interconnect such as the connector has been described by way of example, but the present invention is not limited to this embodiment. For example, the circuit board may be provided with voltage detecting interconnects for detecting voltages of batteries, or temperature sensing interconnects for sensing temperatures of the batteries. Here, temperature sensing devices such as thermistors are connected to the temperature sensing interconnects, and the temperature sensing devices are brought into contact with the batteries, so that the sensing devices can sense the temperatures of the batteries. In this way, the voltages and the temperatures of the plurality of batteries can individually be detected and controlled. As a result, control is possible in consideration of, for example, variations of the characteristics or aging variation of the batteries, so that it is possible to further increase reliability and safety. Note that the pattern width of the voltage detecting interconnects or the temperature sensing interconnects on the circuit board can significantly be smaller than that of the power supply interconnect. This is because a high current flows through the power supply interconnect, and thus power loss due to interconnect resistance has to be reduced, whereas the voltage detecting interconnects or the temperature sensing interconnects can perform detection/sensing by a very low current. Thus, the power supply interconnect and pairs of the voltage detecting interconnects and the temperature sensing interconnects can efficiently be arranged on the circuit board, so that space required for interconnection can significantly be reduced.

Figure 7:
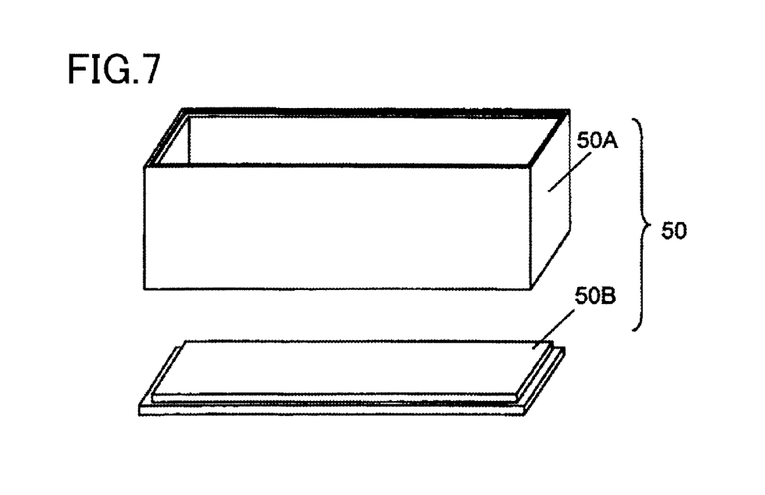
FIG. 7 is an exploded perspective view illustrating yet another embodiment of the housing of the present invention.

In the present embodiment, the housing having an opening end on its one side has been described by way of example, but the present invention is not limited to this embodiment. For example, as illustrated in FIG. 7, a housing 50 may include a frame body 50A and a closing member 50B. The frame body 50A has opening ends on both ends thereof to store a plurality of batteries. The closing member 50B closes one of the opening ends. Also in this case, the cooling pipe insertion openings 71 are not illustrated in the figure.

Figure 8:
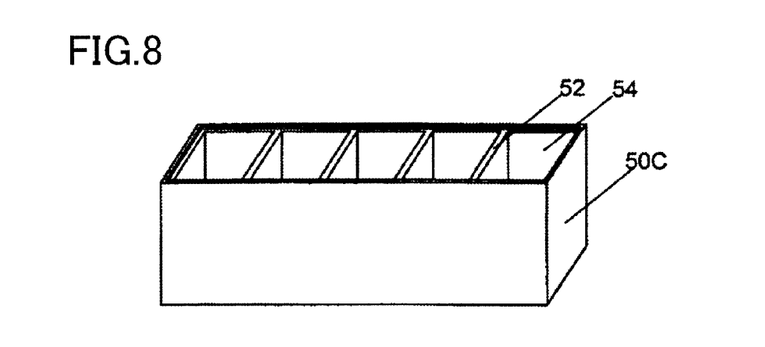
FIG. 8 is an exploded perspective view illustrating still another embodiment of the housing of the present invention.

With this configuration, assembly properties and workability such as connection of the batteries included in the battery module to the circuit board or to the connection plate are improved, thereby obtaining a battery module having high productivity. Alternatively, a frame body 50C having a partition portion 52 as illustrated in FIG. 8 can be used for individually storing batteries instead of the frame body 50A of FIG. 7. With this configuration, transmission or dissipation of excessive heat generated in a battery having a problem to neighboring batteries can further be reduced by the partition portion 52. Thus, it is possible to obtain a battery module having higher reliability and higher safety.

Figure 9:
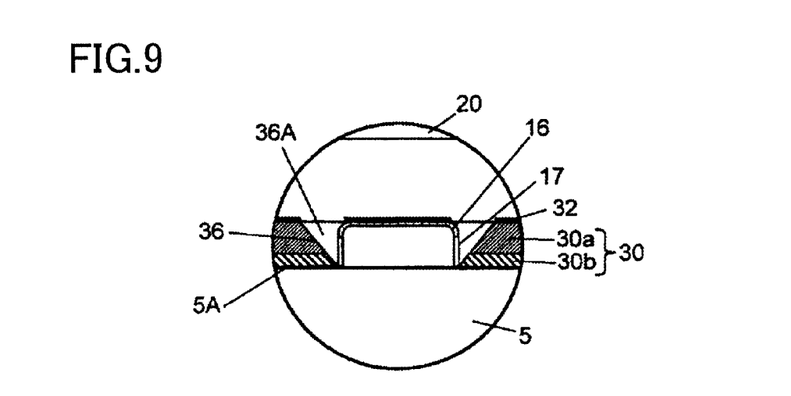
FIG. 9 is an enlarged cross-sectional view illustrating a part of another embodiment of the circuit board of the present invention.

In the present embodiment, the case where the shape of the through hole formed in the circuit board is the same in the thickness direction has been described by way of example, but the present invention is not limited to this embodiment. For example, as illustrated in FIG. 9, the size of the through hole can be smaller at a position of the circuit board closely in contact with the upper surface of the battery case than at a position of the circuit board close to the connector 32. With this configuration, the release efficiency of gas emitted from the opening portion of the positive electrode cap of the battery into the exhaust chamber of the lid body can be increased (the release resistance can be reduced). Furthermore, the area where the circuit board is closely in contact with the upper surface of the battery main body is increased to significantly reduce gas entering the battery main body side, so that reliability and safety can be improved.

Note that in the embodiments, charge/discharge of the battery module, and control circuits for detecting and controlling temperature or voltages are not described in particular or illustrated in the figures, but the control circuits may, of course, be provided outside or inside the battery module. Alternatively, a device configured to supply a medium to or to circulate a cooling medium in the cooling pipe 70 may be provided.

In the embodiments, cylindrical batteries are described as the batteries included in the battery modules by way of example, but the invention is not limited to these embodiments. For example, square batteries can be used.

In the present embodiment, a battery module including a plurality of batteries connected in parallel has been described by way of example, but the batteries may be connected in series. Using an interconnection structure in which neighboring batteries are connected in series with the positive electrode caps 16 being disposed on the same side can provide advantages relating to an exhaustion passage. Alternatively, the advantages obtained by the cooling pipe 70 can also be obtained when the batteries are arranged such that the positive electrode caps 16 are alternately disposed on opposite sides.

Figure 10:
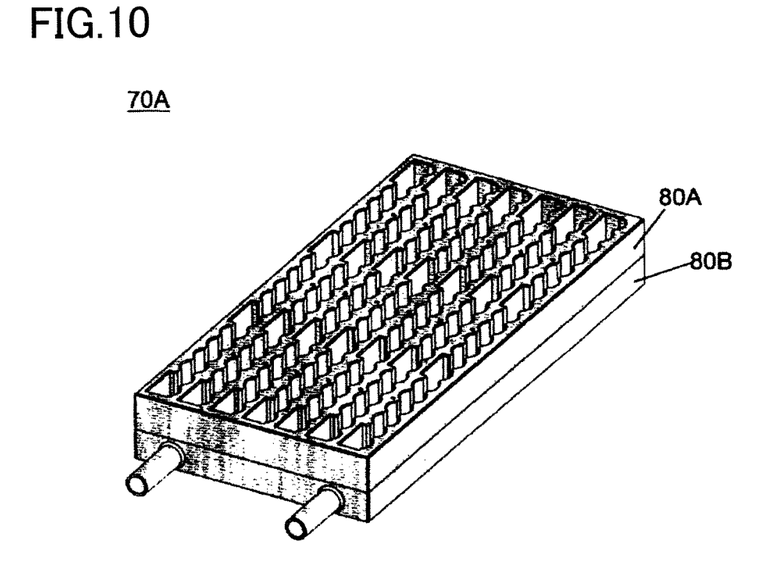
FIG. 10 is a perspective view illustrating another embodiment of the cooling pipe of the present invention.

In the present embodiment, a cooling pipe which is has a deformable layered structure including a metal film and resin layers provided on both surfaces of the metal film, and is provided in a housing in which batteries are stored has been described by way of example, but the present invention is not limited to this example. For example, as illustrated in FIG. 10, the cooling pipe 70A may be made of a resin compact having a hollow portion. In this case, the plurality of batteries included in the battery module can be fixed closely in contact with the inner wall of the hollow portion, thereby further increasing the cooing effect. Specifically, the cooling pipe 70A can be formed of a resin molded product such as polypropylene (PP, melting point: 130-170° C.) formed in a predetermined shape by blow molding or compressed-air molding. In this case, as illustrated in FIG. 10, for example, upper and lower two members 80A, 80B may be formed, and the interface between the members may be sealed by, for example, vibration welding, laser welding, ultrasonic welding, or hot-wire welding to form the cooling pipe 70A. Alternatively, the cooling pipe 70A can integrally be molded in one step, so that the cooling pipe also serves as the housing, allowing the battery module to be downsized. Moreover, when the amount of the cooling medium is the same as the volume of the housing, the amount of the cooling medium filling or circulating in the cooing pipe can be increased, so that the cooling capability is enhanced. In contrast, when that the amount of the cooling medium is the same as the volume of the cooling pipe 70, it is possible to downsize the battery module. Furthermore, when the cooling pipe is made of a resin molded product, assembly properties or workability is improved, thereby obtaining a battery module having a high productivity.

Note that in the above embodiment, a battery shape in which the positive electrode cap 16 serving as an electrode portion protrudes from the upper surface 5A of the battery case 5 has been described by way of example, but the present invention is not limited to this embodiment. For example, as described with reference to FIGS. 11, 12A, and 12B, a battery module may include batteries each having a positive electrode cap 16 provided to substantially be flush with an upper surface 5A of a battery case 5.

Figure 11:
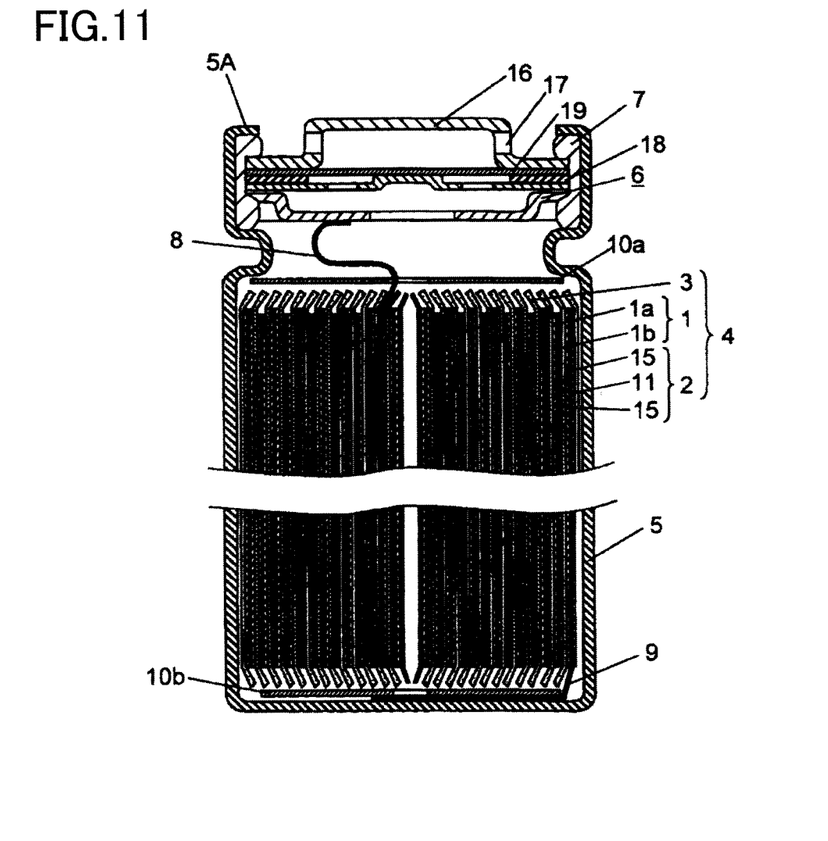
FIG. 11 is a cross-sectional view illustrating a battery included in another embodiment of the battery module of the present invention.
Figure 12:
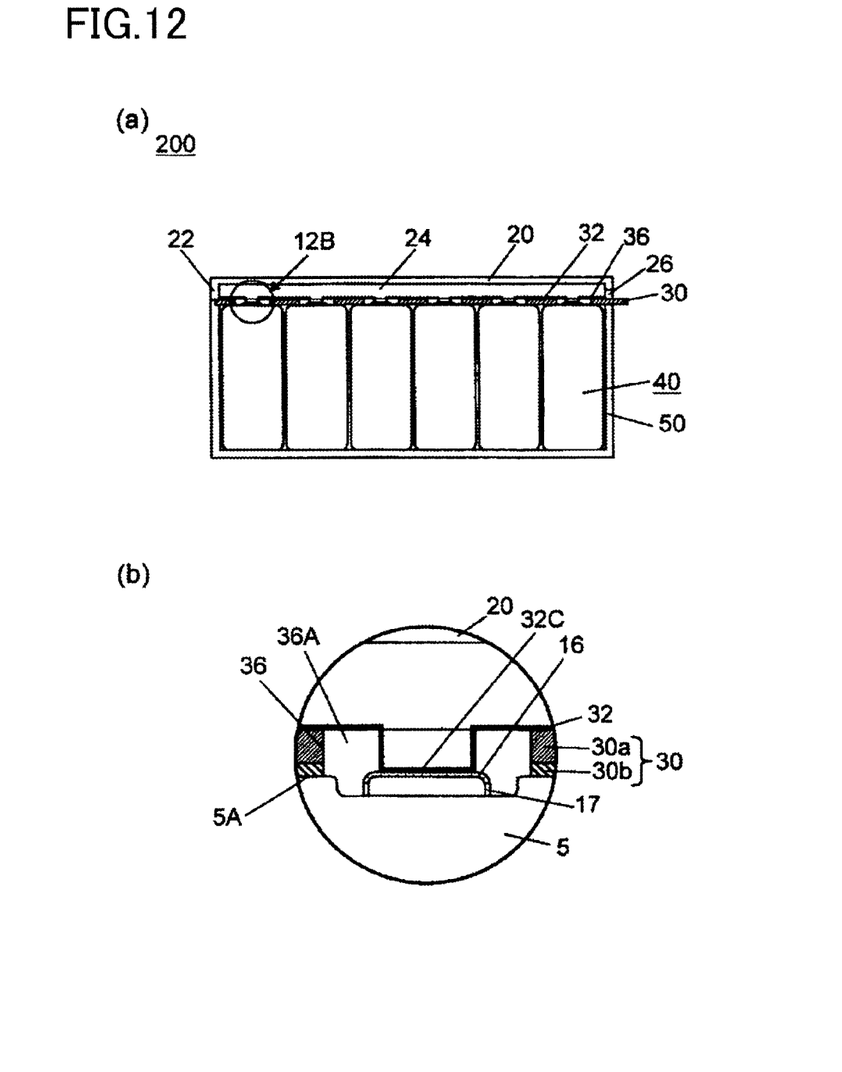
FIG. 12A is a cross-sectional view illustrating the another embodiment of the battery module of the present invention in which multiple ones of the battery of FIG. 11 is used.
FIG. 12B is an enlarged cross-sectional view illustrating the part 12B of FIG. 12A.

FIG. 11 is a cross-sectional view illustrating the shape of another embodiment of the battery included in the battery module of the present invention. FIG. 12A is a cross-sectional view illustrating another embodiment of the battery module of the present invention in which multiple ones of the battery of FIG. 11 is used. FIG. 12B is an enlarged cross-sectional view of the part 12B of FIG. 12 A.

As illustrated in FIGS. 12A and 12B, the present embodiment is different from the above embodiment in that positive electrode caps 16 each provided to substantially be flush with an upper surface 5A of a battery case 5 is connected to a connector 32 of a circuit board 30, wherein through holes 36 are provided in positions of the circuit board 30 corresponding to the positive electrode caps 16, and the connector 32 has a shape of a downwardly convex portion 32C. Note that the other configurations are the same as those of the above embodiment, and thus the description thereof is omitted.

With this configuration, advantages similar to those of the above embodiments can be obtained. Moreover, regardless of the positional relationship of the positive electrode caps of the electrode portions of the batteries, a thin and small battery module 200 can be obtained. Note that the example described in the above embodiment is, of course, applicable to this embodiment.

Next, a battery pack of an embodiment of the present invention will be described with reference to FIGS. 13A and 13B.

Figure 13:
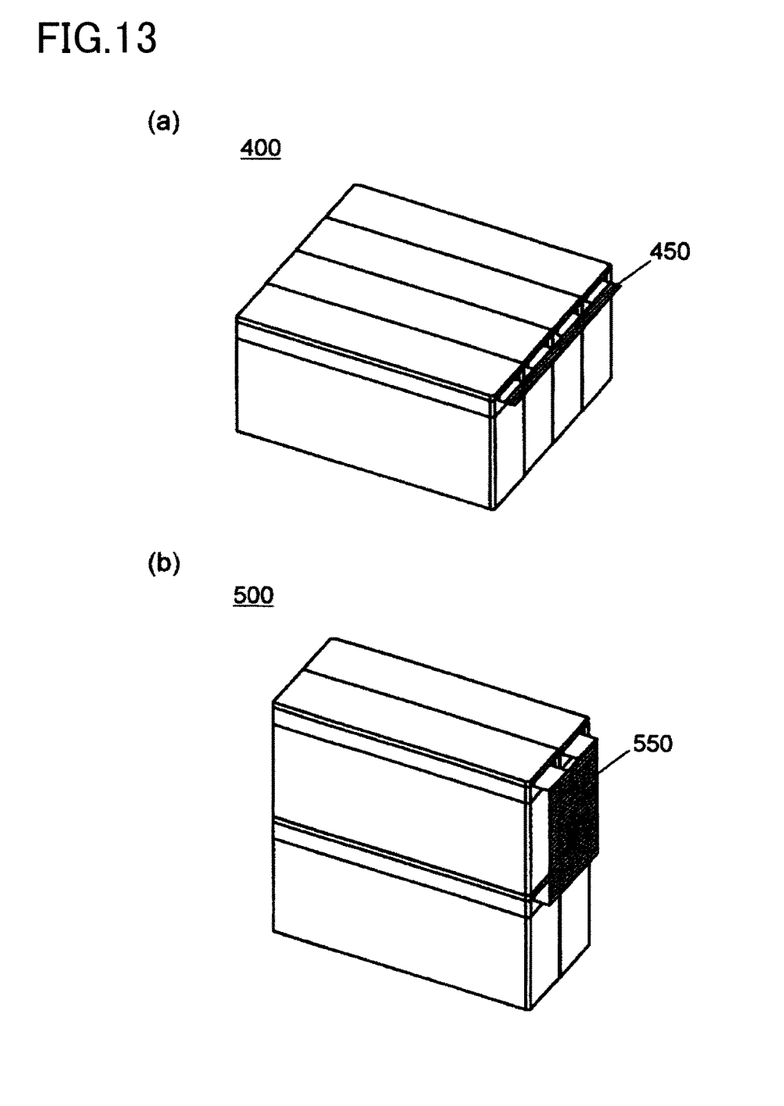
FIGS. 13A and 13B are assembled perspective views each illustrating a battery pack of an embodiment of the present invention.

FIGS. 13A and 13B are assembled perspective views each illustrating the battery pack of the present embodiment of the present invention. In FIG. 13A, four battery modules of the above embodiments are arranged in parallel, and are connected by a connection member 450, thereby forming a battery pack 400. Alternatively, in FIG. 13B, battery modules of the above embodiments are parallelly arranged in pairs, the obtained two pairs of the battery modules are stacked in two tiers in the vertical direction, and are connected by a connection member 550, thereby forming a battery pack 500. Here, the battery modules are connected by the connection member, in parallel, in series, or in parallel and in series, thereby forming the battery pack.

According to the present embodiment, highly versatile battery packs having a required voltage and electric capacity can easily be obtained by arbitrarily combining battery modules in consideration of installation space depending on the application.

Moreover, according to the present embodiment, even when a problem occurs in any one of the battery modules, emitted gas is not ignited, and can be exhausted, in a gaseous state, to the outside. As a result, explosive expansion due to ignition of gas is not caused. Thus, it is possible to obtain a battery pack in which no battery module ruptures, and which is safe and has high reliability.

INDUSTRIAL APPLICABILITY

The present invention is applicable to battery modules for vehicles, bicycles, or electric tools, in particular, hybrid vehicles or electric vehicles which require large capacities, high voltages, and also high reliability and safety.

DESCRIPTION OF REFERENCE CHARACTERS

1 Positive Electrode
1a Positive Electrode Current Collector
1b Positive Electrode Layer
2 Negative Electrode
3 Separator
4 Electrode Group
5 Battery Main Body
5A Upper Surface
6 Sealing Plate
7 Gasket
8 Positive Electrode Lead
9 Negative Electrode Lead
10a, 10b Insulating Plate
11 Negative Electrode Current Collector
15 Negative Electrode Layer
16 Positive Electrode Cap (Electrode Portion)
17 Opening Portion
18 Current Cutoff Member
19 Vent Mechanism
20 Lid Body
22 Outer Circumferential Wall
24 Exhaust Chamber
26 Opening
28 Rib Portion
28A Opening Hole
30 Circuit Board (Flat Plate)
30a Heat-Resistant Member
30b Elastic Member
32, 34 Connector
32C Convex Portion
33 Connection Plate
33A Extension Portion
36 Through Hole
36A Gap
40 Battery Unit
45 Gas
50 Housing
50A, 50C Frame Body
50B Closing Member
52 Partition Portion
54 Storage Portion
65 Supporting Member
66 External Frame
68 Supporting Portion
70, 70A Cooling Pipe
71 Cooling Pipe Insertion Opening
80A, 80B Member
100, 200 Battery Module
400, 500 Battery Pack
450, 550 Connection Member

The invention claimed is:

1. A battery module comprising:
a plurality of batteries;
a housing in which the plurality of batteries are aligned and stored;
a cooling pipe provided along the plurality of batteries in the housing, the cooling pipe being filled with a cooling medium, wherein
the cooling pipe has a layered structure including a metal film and resin layers provided on both surfaces of the metal film, and is ruptured by melting the resin layers and by rupturing the metal film when a temperature of the battery reaches or exceeds a predetermined temperature,
the cooling pipe is formed into a bag shape, and
the housing is partitioned by a flat plate disposed in contact with battery cases around electrode portions of the batteries into a storage portion in which the plurality of batteries are stored, and an exhaust chamber via which gas released from an opening portion of the electrode portion is exhausted outside the housing.

2. The battery module of claim 1, wherein:
each of the batteries has an opening portion at an electrode portion of the battery to release gas generated in the battery outside the battery,
and
the opening portions of the electrode portions are in communication with the exhaust chamber via through holes formed in the flat plate.

3. The battery module of claim 2, wherein
the flat plate is made of a circuit board, and the electrode portions of the batteries are connected to a connector formed on the circuit board.

4. The battery module of claim 2, wherein the electrode portions of the batteries are inserted in the through holes of the flat plate.

5. The battery module of claim 2, wherein the storage portion is sealed by the flat plate.

6. A battery module comprising:
a plurality of batteries;
a housing in which the plurality of batteries are aligned and stored;
a cooling pipe provided along the plurality of batteries in the housing, the cooling pipe being filled with a cooling medium, wherein:
the cooling pipe has a layered structure including a metal film and resin layers provided on both surfaces of the metal film, and is ruptured by melting the resin layers and by rupturing the metal film when a temperature of the battery reaches or exceeds a predetermined temperature, and
the metal film is made of aluminum foil having a thickness of 90-120 μM.

7. The battery module of claim 6, wherein:
each of the batteries has an opening portion at an electrode portion of the battery to release gas generated in the battery outside the battery,
the housing is partitioned by a flat plate disposed in contact with battery cases around the electrode portions of the batteries into a storage portion in which the plurality of batteries are stored, and an exhaust chamber via which the gas released from the opening portion of the electrode portion is exhausted outside the housing, and
the opening portions of the electrode portions are in communication with the exhaust chamber via through holes formed in the flat plate.

8. The battery module of claim 7, wherein
the flat plate is made of a circuit board, and
the electrode portions of the batteries are connected to a connector formed on the circuit board.

9. The battery module of claim 7, wherein the electrode portions of the batteries are inserted in the through holes of the flat plate.

10. The battery module of claim 7, wherein the storage portion is sealed by the flat plate.

11. A battery module comprising:
a plurality of batteries;
a housing in which the plurality of batteries are aligned and stored; and
a cooling pipe provided along the plurality of batteries in the housing, the cooling pipe being filled with a cooling medium, wherein:
the cooling pipe is made of a resin compact which melts when a temperature of the battery reaches or exceeds a predetermined temperature, and has a hollow portion, and
the plurality of batteries are accommodated into the hollow portion of the cooling pipe, and are closely in contact with and fixed to an inner wall of the hollow portion.

12. The battery module of claim 11, wherein:
each of the batteries has an opening portion at an electrode portion of the battery to release gas generated in the battery outside the battery,
the housing is partitioned by a flat plate disposed in contact with battery cases around the electrode portions of the batteries into a storage portion in which the plurality of batteries are stored, and an exhaust chamber via which the gas released from the opening portion of the electrode portion is exhausted outside the housing, and
the opening portions of the electrode portions are in communication with the exhaust chamber via through holes formed in the flat plate.

13. The battery module of claim 12, wherein
the flat plate is made of a circuit board, and
the electrode portions of the batteries are connected to a connector formed on the circuit board.

14. The battery module of claim 12, wherein the electrode portions of the batteries are inserted in the through holes of the flat plate.

15. The battery module of claim 12, wherein the storage portion is sealed by the flat plate.

16. A battery pack comprising:
multiple ones of the battery module of any one of claims 1, 3-5 and 6-15, and the battery modules are aligned and connected in series and/or parallel.

* * * * *